March 23, 1965  J. P. WESSON  3,174,618
CONVEYOR STRUCTURE FOR FOOD PRODUCTS
Filed Oct. 18, 1961  3 Sheets-Sheet 1

INVENTOR
JOSEPH P. WESSON
BY: Featherstonhaugh & Co
ATTORNEYS

March 23, 1965  J. P. WESSON  3,174,618
CONVEYOR STRUCTURE FOR FOOD PRODUCTS
Filed Oct. 18, 1961  3 Sheets-Sheet 2

INVENTOR
JOSEPH P. WESSON
BY: Featherstonhaugh & Co
ATTORNEYS

March 23, 1965　　　J. P. WESSON　　　3,174,618
CONVEYOR STRUCTURE FOR FOOD PRODUCTS
Filed Oct. 18, 1961　　　　　　　　　　　3 Sheets-Sheet 3
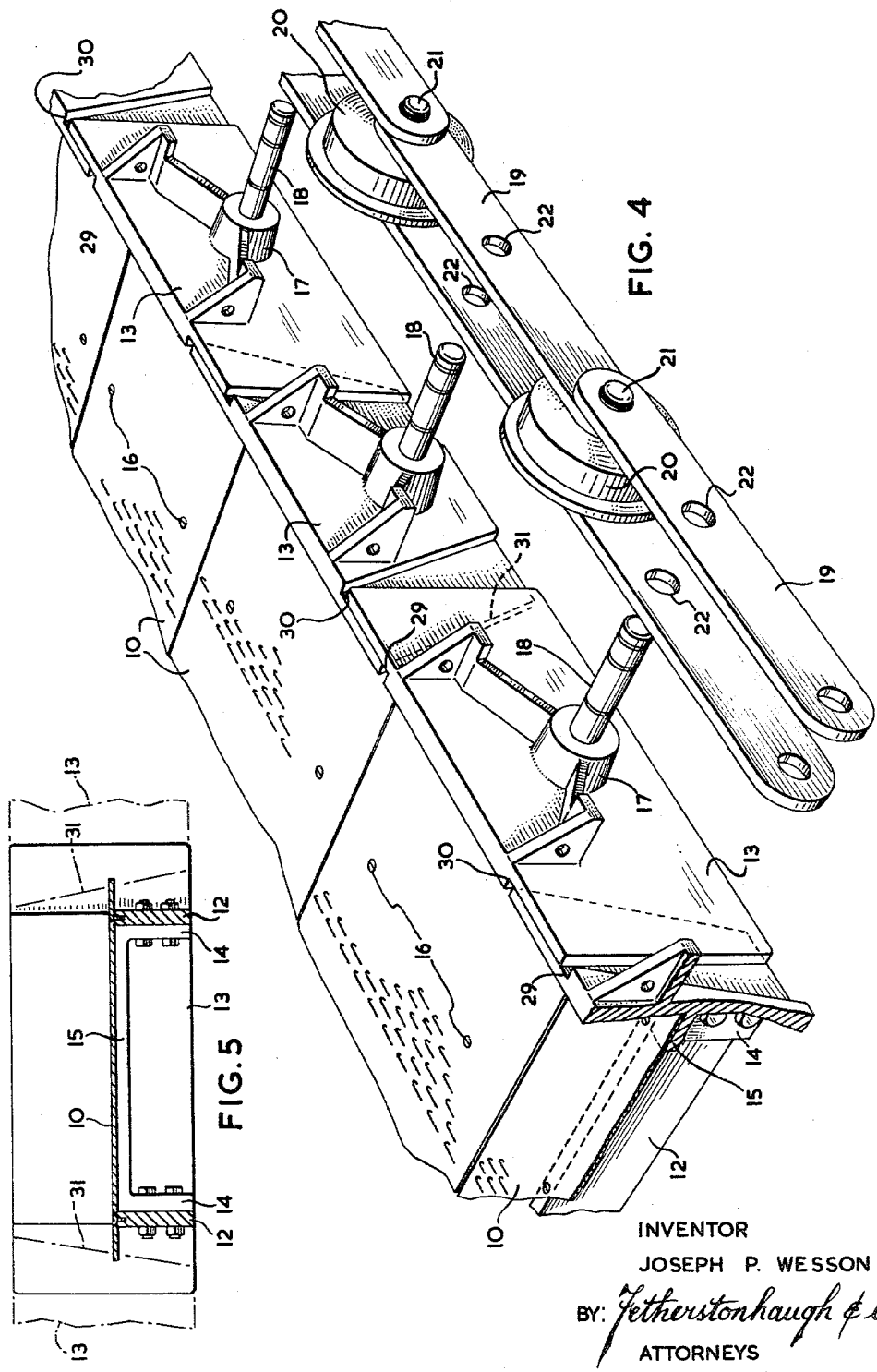
INVENTOR
JOSEPH P. WESSON
BY: Fetherstonhaugh & Co
ATTORNEYS

United States Patent Office 3,174,618
Patented Mar. 23, 1965

3,174,618
CONVEYOR STRUCTURE FOR FOOD PRODUCTS
Joseph P. Wesson, Bury St. Edmunds, England, assignor to Dominion Malting (Ontario) Limited, Toronto, Ontario, Canada, a corporation of Canada
Filed Oct. 18, 1961, Ser. No. 145,812
Claims priority, application Great Britain, Oct. 19, 1960, 35,847/60
1 Claim. (Cl. 198—195)

This invention relates to conveyor structure for food products and particularly for the travelling support of a bed of grain.

The invention will be conveniently described in respect to the malting of grain wherein the grain is carried in a bed by endless conveyor structure.

In malting of grain the moistened grain is carried through stages of humid aeration and moistening, as well as subjected to temperatures conducive to germination in the malting process. Accordingly, it is necessary that conveyors used for moving the grain must be made of material which is non-corrodible. Moreover, it is desirable also that the conveyor should be as light as possible. Consequently, it is not practicable to employ a conveyor made up, for instance, of heavy metal sufficiently rigid to provide necessary support for a deep bed of grain while, apart from this, even if practicable, the cost would be too high. Accordingly, it is desirable to employ a conveyor supporting surface of thin suitable material such as aluminum, stainless steel, or other non-corrodible material, aluminum being a preference because of its light weight. The present invention, therefore, seeks to provide a practical, non-corrodible conveyor structure for purposes of this kind.

The invention generally embodies conveyor structure comprising a plurality of transversely extending, contiguous, thin, foraminous plates of non-corrodible material arranged as an endless belt, a supporting element backing each plate and rigidly secured thereto and including an end plate perpendicular to the plane of each foraminous plate, secured to each end of each supporting element and substantially abutting each end of said foraminous plate, said end plates being operatively link connected for pivotal movement in an articulated endless unit and roller means adapted to support said unit on tracks as a movable endless belt. It also includes in combination cooperating supporting and housing structure.

The invention will be clearly understood by reference to the following detailed specification taken in conjunction with the accompanying drawings, in which FIG. 1 is a fragmentary perspective illustration of conveyor structure in accordance with the present invention.

FIG. 4 is an enlarged fragmentary perspective exploded view of the conveyor structure including link chain means for supporting and moving the conveyor.

FIG. 5 is a transverse section taken through one of the conveyor plates and its supporting elements.

Figure 3:
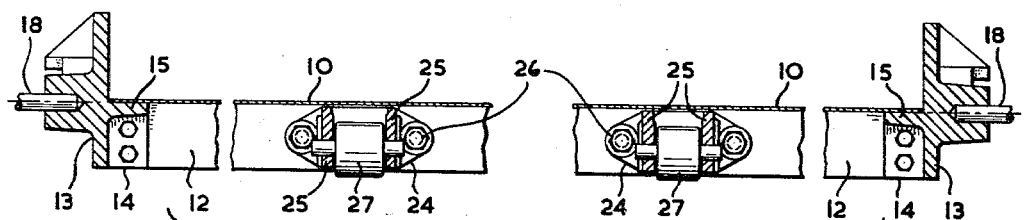
FIG. 3 is a transverse section taken substantially on the line 3—3 of FIG. 1.
Figure 6:
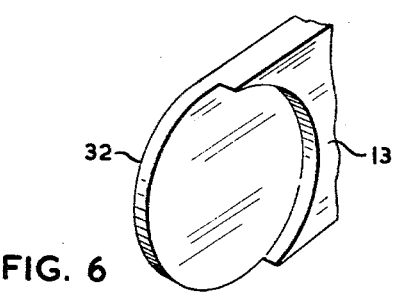
FIG. 6 is a perspective illustration of a modified form of end plate structure.

Referring to the drawings, A indicates a conveyor structure as a whole which is formed as an endless conveyor and is adapted to be supported and moved on side tracks B and intermediate tracks C forming part of the supporting structure. The supporting surface of the conveyor comprises a plurality of transversely extending, contiguously arranged, thin, foraminous plates 10 which are each individually rigidified and supported by a supporting element 11 which, in the preferred form shown, constitutes a framework made up of a pair of parallel bars 12 arranged to underlie each plate throughout its length adjacent to the side edges thereof, which bars, as shown particularly in FIG. 3, are connected at their ends to an end plate structure 13 preferably in the form of a casting which includes the bar connecting flanges 14 and the integral plate supporting flange 15 adapted transversely to support the ends of each foraminous plate 10. This is clearly illustrated, particularly in FIGS. 3 and 4. The end plate structure 13 is, as illustrated, disposed perpendicularly to the plane of the foraminous plates 10 and abuts the ends of each foraminous plate and extends above the plane of the foraminous plates to provide a supporting side margin for the conveyor when it is operatively mounted. As indicated in FIG. 4, the foraminous plates 10 are fastened to the bars 12 in any suitable way such as by the machine screws 16.

The end plates 13 are formed with the enlarged centrally located bosses 17 which have a central bore designed to receive a pin 18 therein and which projects transversely outwardly of the plate as a means for articulated connection with the articulated link chain 19. The link chain, of course, forms a means of moving the conveyor and also operates in the support of the conveyor. In this connection, flanged rollers 20 are rotatably supported on the pivot pin 21 which pivotally connects the ends of the links as an articulated chain. The links are orificed centrally as at 22 between their points of pivotal connection as to receive therein the pins 18 projecting from the end plates 13 of the conveyor structure. In the preferred construction illustrated, the pins 18 are merely socketed in the sleeve bosses 17 and are secured in their connection with the links 19 by detachable means operatively connected to the circumferential grooves in such pins and when the flanged rollers 20 are engaged with the tracks B of the supporting structure, it is clear that the pins are held firmly in their sockets 17 of the end plates 13 of the conveyor. In this instance, it may be noted that if one or more of the foraminous plates 10 become damaged or need replacement, it is merely a matter of detaching the securing means from the pins 18 whereupon such pin may be withdrawn from its socket and thus the plate and its supporting element or frame may be readily removed and replaced.

Figure 1:
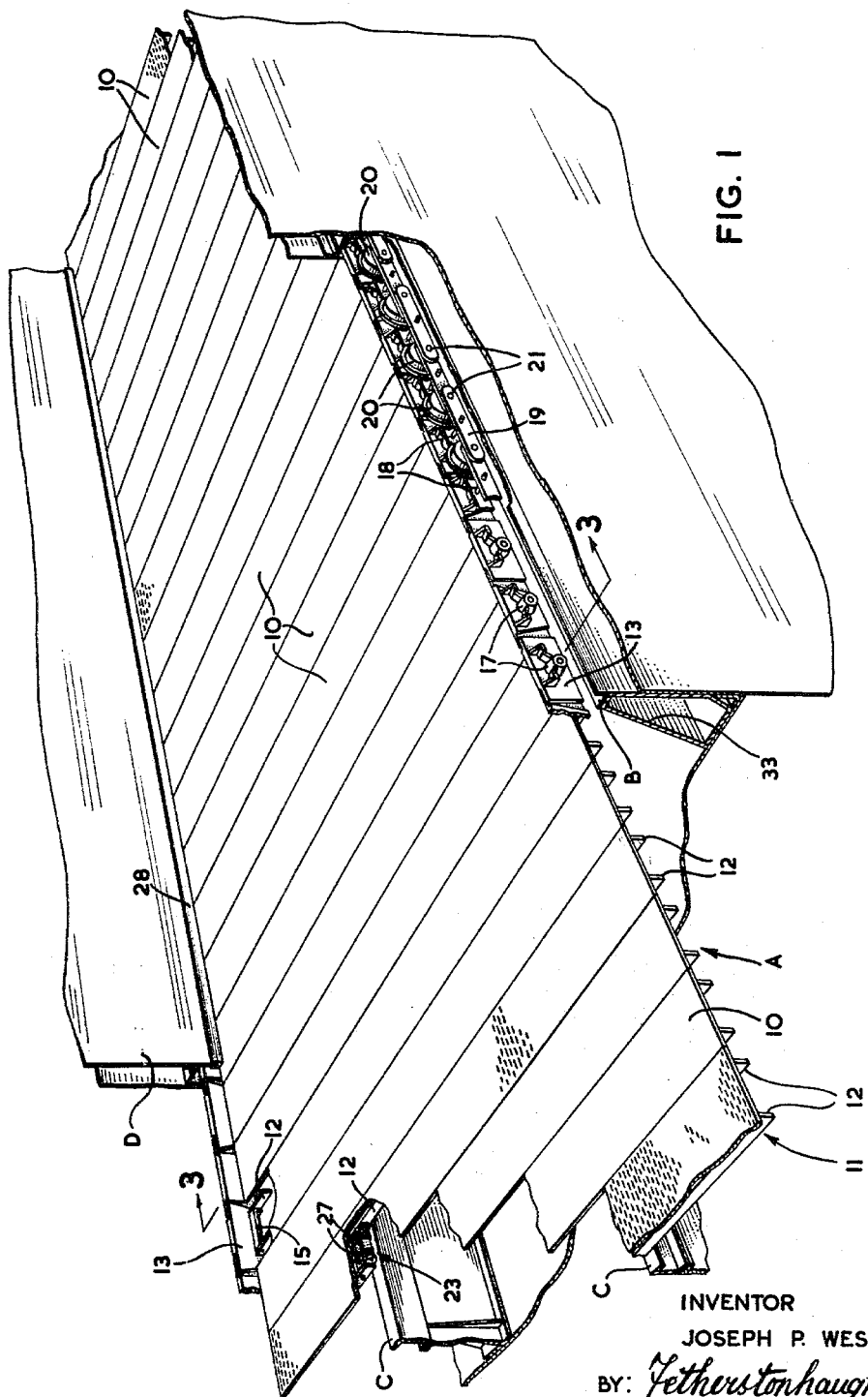
Figure 2:
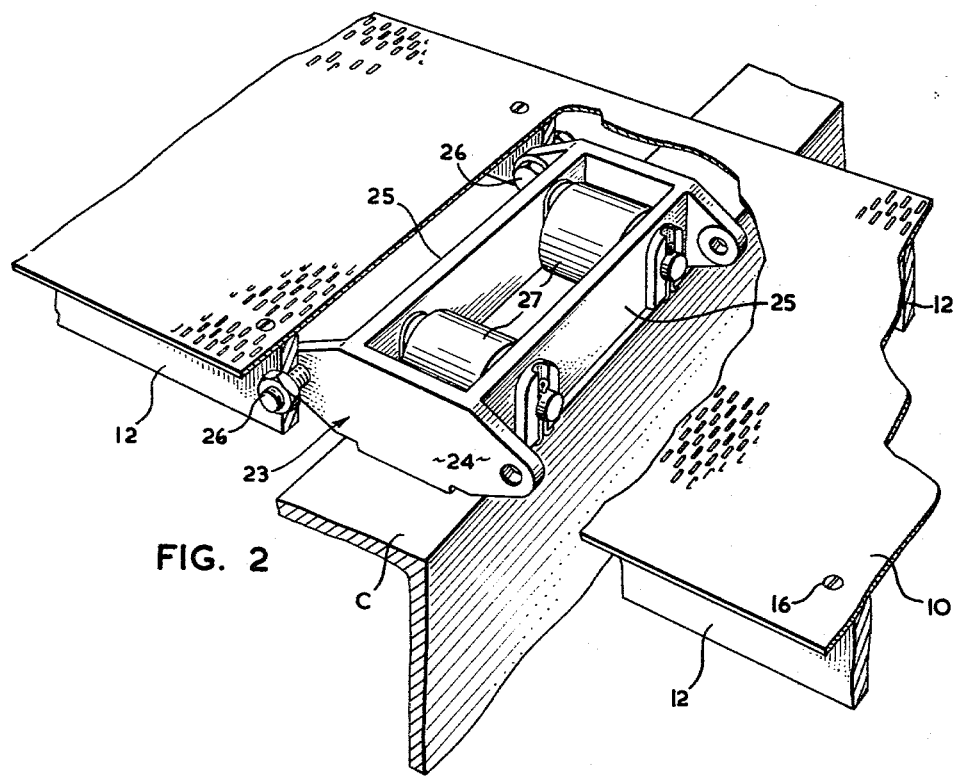
FIG. 2 is an enlarged fragmentary perspective detail partly in section showing part of the means for supporting the conveyor structure.

Referring to FIGS. 1, 2 and 3, between each pair of bars 12 supporting a foraminous plate 10 and at points intermediate the ends of said foraminous plates, a roller supporting unit 23 is incorporated which is preferably in the form of a casting made up of end members 24 and spaced apart side members 25, the end members 24 being orificed and bolted as at 26 to the parallel bars 12 supporting the foraminous plates 10. Incorporated between the side elements 25 of unit 23 are a pair of rollers 27 and which are designed to engage in roller bearing engagement with the intermediate tracks C of the conveyor supporting structure in a stable manner which will avoid any tendency of the plates 10 tilting during load supporting travel. Accordingly, the conveyor is firmly and movably supported at its side edges and at points intermediate thereof. Consequently, the conveyor supporting surface, made up of a plurality of thin, foraminous plates of non-corrodible material, is adapted to readily support the load of a deep grain bed.

As shown in FIG. 1, the tracks B and C are incorporated within a housing structure which includes the interior side walls D, the lower edges of which incorporate a suitable sealing strip 28 which encloses the lower edges thereof. This is adapted for wiping engagement with the upper surface of the foraminous plates of the conveyor and the upper extensions of the end plates 13 of each conveyor plate are adapted to overlap and to butt the lower extremities of side walls D in wiping engagement as to lend support thereto against the weight of the bed of grain travelling on the conveyor and engaging the side walls D in passage through the apparatus. It should be noted in this connection that the end plates 13 of the supporting structure for the foraminous plates are preferably formed to lap with one another and wherein the ends of each alternate plate are undercut as at 29 on the inside, whereas the alternate plates are undercut as at 30 on the outside, the ends of the latter plates being preferably sloped as at 31 so as to provide for a wide degree of lapping between the plates at their upper end whereby this lapping is maintained when the plates travel in a curved path as the chain 19 moves around the sprockets at each end of the conveyor.

Alternatively the end plates 13 may be formed so that the ends of the lapping undercut portions are arcuate and formed on a substantially common radius as at 32 so that when the plates travel in a curved path as the chain 19 moves around the sprockets at each end of the conveyor, the curved end surface 32 will remain substantially contiguous with the mating surface of the adjacent plate since close tolerance can be achieved. Consequently, this tends to prevent the entrance of any grain particles between the portions of the articulating plates.

The upper reach of the endless conveyor is designed to overlie a plenum chamber, in the case of the illustration used in the present description, and which is suitably sealed by a sealing means (not shown) adapted to extend from the plenum wall 32 (FIG. 1), engageable with the lower edges of the end plates 13 of the conveyor, and in this connection the lapped end plates 13, in their lapped supporting engagement with side walls D and seal 28 thereof contribute to maintaining a reasonable seal between the conveyor structure and the plenum chamber such that the travelling bed of grain may be subjected to a controlled aeration effected through the plenum chamber as to permit passage of air, conditioned as required, through the thin, foraminous plates of the conveyor and through the travelling grain bed carried thereby.

Having regard to the foregoing, it is clear that the conveyor structure described is eminently suitable for the processing described permitting the use of thin, non-corrodible plates for supporting the heavy grain bed adapted to be carried thereby and permitting its treatment under conditions of moisture while avoiding contamination of the grain by reason of the non-corrodible nature of the supporting surface. The conveyor structure also lends to a relatively light conveyor structure.

What I claim as my invention is:

In a conveyor structure employing a plurality of units forming an endless belt and arranged to extend transversely thereof in substantially contiguous side by side relation, said units comprising: a thin, foraminous top plate of substantially non-corrodible material and a rigid supporting element backing said plate and rigidly secured thereto, end plates carried by said supporting element substantially butting each end of said foraminous plate and extending thereabove, thereby providing a supporting side margin for the conveyor, means carried by said end plates for connecting said units in articulated relation as an endless belt, said rigid supporting element including a pair of spaced apart bars connected to the top plate adjacent its side margins, said bars being connected together at their ends by said end plates, said rigid supporting element further including at least one cross support interconnecting said bars intermediate their ends, and at least one roller carried by said cross support to stabilize each unit during load support travel.

References Cited by the Examiner
UNITED STATES PATENTS

| | | | |
|---|---|---|---|
| 812,374 | 2/06 | Smead | 198—195 |
| 1,586,382 | 5/26 | Reed | 198—195 |
| 1,883,528 | 10/32 | Buck | 198—195 |
| 2,329,687 | 9/43 | Becker | 198—195 X |
| 2,936,063 | 5/60 | Hemsley | 198—196 |
| 3,082,861 | 3/63 | Kornylak | 198—195 |

SAMUEL F. COLEMAN, *Primary Examiner.*

JULIUS E. WEST, ERNEST A. FALLER, Jr., *Examiners.*